United States Patent
Okuda et al.

(10) Patent No.: US 8,814,174 B2
(45) Date of Patent: Aug. 26, 2014

(54) RUBBER GASKET AND SEAL STRUCTURE USING THE SAME

(75) Inventors: Matsuhiro Okuda, Okayama (JP); Dai Mori, Okayama (JP); Yoshiharu Chino, Aichi (JP); Atsushi Nishigaki, Aichi (JP); Naoki Kira, Aichi (JP); Takahiro Inokuchi, Aichi (JP)

(73) Assignees: Uchiyama Manufacturing Corp., Enami, Naka-ku, Okayama-shi, Okayama (JP); Toyota Jidosha Kabushiki Kaisha, Toyota-cho, Toyota-shi, Aichi (JP); Aisin Seiki Kabushiki Kaisha, Asahi-machi, Kariya-shi, Aichi (JP)

( * ) Notice: Subject to any disclaimer, the term of this patent is extended or adjusted under 35 U.S.C. 154(b) by 0 days.

(21) Appl. No.: 13/808,675

(22) PCT Filed: Jun. 30, 2011

(86) PCT No.: PCT/JP2011/065045
§ 371 (c)(1),
(2), (4) Date: Jan. 7, 2013

(87) PCT Pub. No.: WO2012/005165
PCT Pub. Date: Jan. 12, 2012

(65) Prior Publication Data
US 2013/0106064 A1 May 2, 2013

(30) Foreign Application Priority Data
Jul. 8, 2010 (JP) ................................. 2010-155594

(51) Int. Cl.
*F16J 15/12* (2006.01)
(52) U.S. Cl.
USPC .......................... 277/644; 277/628; 277/651

(58) Field of Classification Search
USPC ......... 277/608, 616, 628, 630, 637, 639, 644, 277/651
See application file for complete search history.

(56) References Cited

U.S. PATENT DOCUMENTS

| 4,311,317 A * | 1/1982 | Bartels | 220/304 |
| 4,322,175 A * | 3/1982 | Szczesny | 403/134 |

(Continued)

FOREIGN PATENT DOCUMENTS

| EP | 1808597 A2 | 7/2007 |
| JP | 1985-60-9481 U | 4/1979 |

(Continued)

*Primary Examiner* — Gilbert Lee
(74) *Attorney, Agent, or Firm* — Bacon & Thomas, PLLC

(57) ABSTRACT

A rubber gasket of annular shape adapted to be interposed between two objective members to be sealed and fastened to each other and a seal structure for sealing between two objective members to be sealed and fastened to each other using the gasket. The rubber gasket comprises an integrally molded body made of elastomer having a cylindrical body, a flange-shaped portion, and an annular core member, the flange-shaped portion extending outward from one end of the cylindrical body in axial direction along an entire outer circumferential surface, the annular core member being embedded in the flange-shaped portion along an entire circumference. The rubber gasket is constructed such that when the two objective members to be sealed are fastened with the rubber gasket interposed therebetween, both ends of the cylindrical body in axial direction thereof are positioned respectively at seal line portions of the two objective members to be sealed, and the cylindrical body is compressed by fastening force along fastening direction.

9 Claims, 8 Drawing Sheets

(56) References Cited

U.S. PATENT DOCUMENTS

| | | | |
|---|---|---|---|
| 5,165,834 A * | 11/1992 | Takenouchi et al. | 411/542 |
| 5,409,337 A * | 4/1995 | Muyskens et al. | 411/148 |
| 6,290,240 B1 * | 9/2001 | Knapp | 277/651 |
| 7,204,218 B2 * | 4/2007 | vom Stein | 123/90.38 |
| 7,854,434 B2 * | 12/2010 | Heiman et al. | 277/644 |
| 8,083,237 B2 * | 12/2011 | Smith | 277/616 |

FOREIGN PATENT DOCUMENTS

| | | |
|---|---|---|
| JP | 1986 101118 U | 6/1986 |
| JP | 2-31960 | 2/1990 |
| JP | 1990-40158 U | 3/1990 |
| JP | 1995-35751 U | 7/1995 |
| JP | 2006-250160 | 9/2006 |
| JP | 2007 187105 A | 7/2007 |
| JP | 2009 125903 A | 6/2009 |

* cited by examiner

RUBBER GASKET AND SEAL STRUCTURE USING THE SAME

TECHNICAL FIELD

The present invention relates to a rubber gasket of annular shape to be interposed between two objective members to be sealed and fastened to each other, specifically between two objective members to be sealed with one member being made of synthetic resin and the other member being made of metal, and to a seal structure using the annular rubber gasket.

BACKGROUND ART

Gaskets made of material with rubber elasticity such as rubber, elastomer, or the like, generally called rubber gaskets, are interposed in a compressed condition at a connecting section of two objective members to be fastened and integrated of an internal combustion engine under pressure and other industrial machines, referring to Patent Literatures 1 to 3. Patent Literature 1 discloses the vibration block member which is also used as a gasket, seal member to be interposed between the flange portion of the intake manifold and the manifold mounting surface of the engine body. Patent Literature 2 discloses the gasket made of rubber to be interposed between the cylinder head and the cylinder head cover of the engine. Patent Literature 3 discloses the gasket made of the elastic body to be interposed between the engine and the intake manifold made of synthetic resin.

CITATION LIST

Patent Literature

PTL 1: Japanese Utility Model Publication, examined JP-S60-9481-U
PTL 2: Japanese Utility Model Publication, not examined JP-H02-40158-U
PTL 3: Japanese Utility Model Publication, not examined JP-H07-35751-U

SUMMARY OF INVENTION

Technical Problem

The rubber gasket disclosed in PTL2 is fitted under pressure into the concave groove opened downward at the region to be sealed of the cylinder head cover and is provided between the objective regions to be sealed of the cylinder head gasket. Molded bodies made of synthetic resin have been recently used as cylinder head covers for reducing weight of vehicles and improving fuel consumption. Objective regions to be sealed of cylinder heads are formed in the shape of a groove, gaskets are provided for the groove-shaped gasket mounting portion, and then cylinder head covers made of synthetic resin having flat regions to be sealed are fastened in order to smoothly assemble engines. In such a case, groove-shaped objective regions to be sealed are not formed concave but formed in a stepped shape without an inner wall of the concave groove, on the side of the objective space to be sealed, because cylinder heads are generally made of a cast product made of metal, aluminum or the like. In such a stepped shape without the inner wall, the gaskets may destroy a compressed condition and show bucking at the time of fastening, or the gasket may show bucking because of pressure of fluid (oil pressure) circulating in the objective space to be sealed after fastening, thereby causing deterioration of seal performance. Specifically, request seal pressure of oil delivery sections is as high as 0.6 MPa. When such a request seal pressure is not satisfied, fluid pressure is not appropriately controlled because of fluid leakage, fuel cost becomes high and environments are adversely affected by exhaust gas.

When the cylinder head covers are a molded body made of synthetic resin, a gap is required between the cylinder heads and the cylinder head covers at an outer section provided with the gasket under a predetermined condition that the gaskets are fastened and compressed, considering production tolerance and heat shrink in order to satisfy product performance. Therefore, rubber constituting the gasket moves to the gap and is deformed by compression function caused by fastening and the above-mentioned fluid pressure (inner pressure). As a result, enough surface pressure is not adequately obtained at the objective regions to be sealed, thereby deteriorating seal function. The vibration block member disclosed in PTL1 is interposed between the intake manifold and the manifold mounting surface of the engine body and is constituted by inserting a core metal into an elastic member constituting a main part of seal function, thereby inhibiting elastic deformation of the elastic member and preventing the vibration block member from departing. Pressure caused by fastening works on the section where the core metal is provided with and PTL 1 does not intended to inhibit flow deformation of rubber into the gap where fastening pressure does not work when the gasket is interposed between the step-shaped objective regions to be sealed, as mentioned above.

In case of the gasket disclosed in PTL 2, the member having higher rigidity than the gasket body (rubber) is included in the projecting portion on the side of the gasket body where fastening pressure of the two objective members to be sealed, the cylinder head and the cylinder head cover, does not work. PTL 2 discloses the section with high rigidity may be the entire or a part of the projecting portion. In case that such a portion is a part thereof, function for preventing relief of rubber volume into the gap cannot be obtained. Therefore, it is understood that PTL 2 does not have an intention to inhibit flow deformation of rubber into the gap where the fastening pressure does not work as mentioned above.

The gasket disclosed in PTL 3 is interposed in the connecting portion of the engine and the intake manifold made of synthetic resin. The triangular projection is fitted into the tapered concave portion formed inside the connecting portion of the intake manifold; however, the triangular projection is not directly compressed at the time of fastening and does not become a main portion of seal function because of surface pressure.

The present invention is proposed in view of the above-mentioned problems and has an object to provide a rubber gasket capable of exerting enough seal performance for an objective region to be sealed which is applied with high inner pressure and is formed in the shape of a step and to provide a seal structure using the rubber gasket.

In one aspect of the present invention, a rubber gasket of annular shape adapted to be interposed between two objective members to be sealed and fastened to each other is characterized in that the rubber gasket comprises an integrally molded body made of elastomer having a cylindrical body, a flange-shaped portion, and an annular core member, the flange-shaped potion extending outward from one end of the cylindrical body in an axial direction along an entire outer circumferential surface, the annular core member being embedded in the flange-shaped portion along an entire circumference, and the rubber gasket is constructed such that when the two objective members to be sealed are fastened with the rubber gasket interposed therebetween, both ends of the cylindrical body in the axial direction thereof are positioned respectively at seal line portions of the two objective members to be sealed, and the cylindrical body is compressed by fastening force along a fastening direction.

In the rubber gasket of the present invention, an outward projecting portion can be provided on the outer circumferential surface of the cylindrical body. In such a case, the projecting portion can have foot portions constituted as a base portion from which the projecting portion expands outward and a top portion projecting outermost, and the projecting portion can be constructed such that distance between the foot portions is larger than projecting height of the top portion, and a cross-section of the projecting portion in the axial direction can be formed in the shape of a gentle chevron in such a manner that the foot portions gradually expand toward the top portion. In addition, the projecting portion can be intermittently provided along a circumferential direction of the cylindrical body.

In another aspect of the present invention, a seal structure for sealing between two objective members to be sealed and fastened to each other using any one of the rubber gaskets as mentioned above is characterized in that one of the two objective members to be sealed has a step-shaped portion of which inside is opened by a step-floor portion including one of the seal line portions and an inner circumferential wall portion perpendicular to the step-floor portion, whereas the other member of the two objective members to be sealed has a flat-shaped portion parallel to the step-floor portion and including the other seal line portion, the rubber gasket is constructed such that when the two objective members to be sealed are fastened with the rubber gasket interposed therebetween, the one end of the cylindrical body in the axial direction thereof faces the flat-shaped portion of the other member and the other end of the cylindrical body in the axial direction thereof faces the step-floor portion of the one member, and the outer circumferential surface of the cylindrical body faces the inner circumferential wall portion, and when the two objective members to be sealed are fastened under a predetermined fastening condition, with the cylindrical body being compressed by fastening force along the fastening direction, and with the flange-shaped portion positioned outside the seal line portion in a diametrical direction, a gap is formed between the two objective members to be sealed where the flange-shaped portion is interposed, thereby the fastening force does not act on the flange-shaped portion.

Advantageous Effects of Invention

In the first aspect of the present invention or the second aspect of the present invention, the rubber gasket is interposed between two objective members to be sealed, one member having the step-shaped portion of which inside is opened by the step-floor portion including one of the seal line portions and the inner circumferential wall portion being perpendicular to the step-floor portion, and the other member having the flat-shaped portion which is parallel to the step-floor portion and includes the other seal line portion. In such an interposed condition, one end of the cylindrical body in the axial direction thereof faces the flat-shaped portion of the other member and the other end of the cylindrical body in the axial direction faces the step-floor portion of the one member. In addition, the outer circumferential surface of the cylindrical body faces the inner circumferential wall portion. The cylindrical body is compressed by fastening pressure along the fastening direction between the step-floor portion constituted as the objective region to be sealed of the one member and the flat objective region to be sealed of the other member when the two objective members to be sealed are fastened in a predetermined condition. The cylindrical body is interposed in a compressed condition between the seal line portions of both objective members to be sealed, so that surface pressure is generated between each objective region to be sealed including the seal line portion and each end of the cylindrical body in the axial direction thereof, respectively, thereby exerting seal function.

The outer circumferential surface of the cylindrical body faces the inner circumferential wall portion of the step-shaped portion. Even if the cylindrical body is pushed outward when compression force and inner pressure are applied at the time of fastening, the cylindrical body is regulated by the inner circumferential wall portion and does not cause bucking, thereby keeping an intended compression condition of the cylindrical body. In addition, a part on the side, inner side, of the objective space to be sealed of the region where the cylindrical body is provided is opened, so that inner stress at the time of compression does not become excessive, thereby the cylindrical body hardly generates cracks and so on. When two objective members to be sealed are fastened in a predetermined condition, the flange-shaped portion is provided outside the seal line portion in the dimensional direction, the gap is formed between the two objective members to be sealed where the flange-shaped portion is interposed, and fastening pressure does not work on the flange-shaped portion. In such a case, elastomer constituting the cylindrical body is apt to cause flow deformation by compression operation caused by fastening and inner pressure operation. However, the annular core member is embedded along the entire circumference of the flange-shaped portion, so that such a flow deformation is blocked by the core member, thereby surface pressure of the objective regions to be sealed including the seal line portions is kept and seal function is not deteriorated by flow deformation of elastomer.

In case that the outward projecting portion is formed on the outer circumferential surface of the cylindrical body in the first aspect and the second aspect of the present invention, the projecting portion is compressed between the cylindrical body and the inner circumferential wall portion when the rubber gasket is mounted on the step-shaped portion. The rubber gasket is held in the step-shaped portion by compression reaction force, thereby preventing removal of the rubber gasket during mounting operation. The projecting portion has the foot portions constituted as the base portion from which the projecting portion expands and the top portion projecting outermost, and is formed in such a manner that the distance between the foot portions is larger than the projecting height of the top portion and that the cross-section of the projecting portion in the axial direction is formed in the shape of a gentle chevron in such a manner that the foot portion gradually expand toward the top portion. In such a case, resistance at the time of mounting operation is alleviated and insertion and mounting operations are facilitated. In addition, the foot portion does not likely become a bucking point at the time of fastening procedure posterior to mounting and increasing of inner pressure posterior to fastening, thereby the cylindrical body unlikely leans. In case that the projecting portion is intermittently formed along the circumferential direction of the cylindrical body, air is purged between the projecting portions when the two objective members to be sealed are fastened and the cylindrical body is compressed in the fastening direction. As a result, air is not left in the corner portion of the inner circumferential wall portion and the step-floor portion, thereby stability of sealing performance is not interrupted.

DESCRIPTION OF EMBODIMENTS

Figure 1:
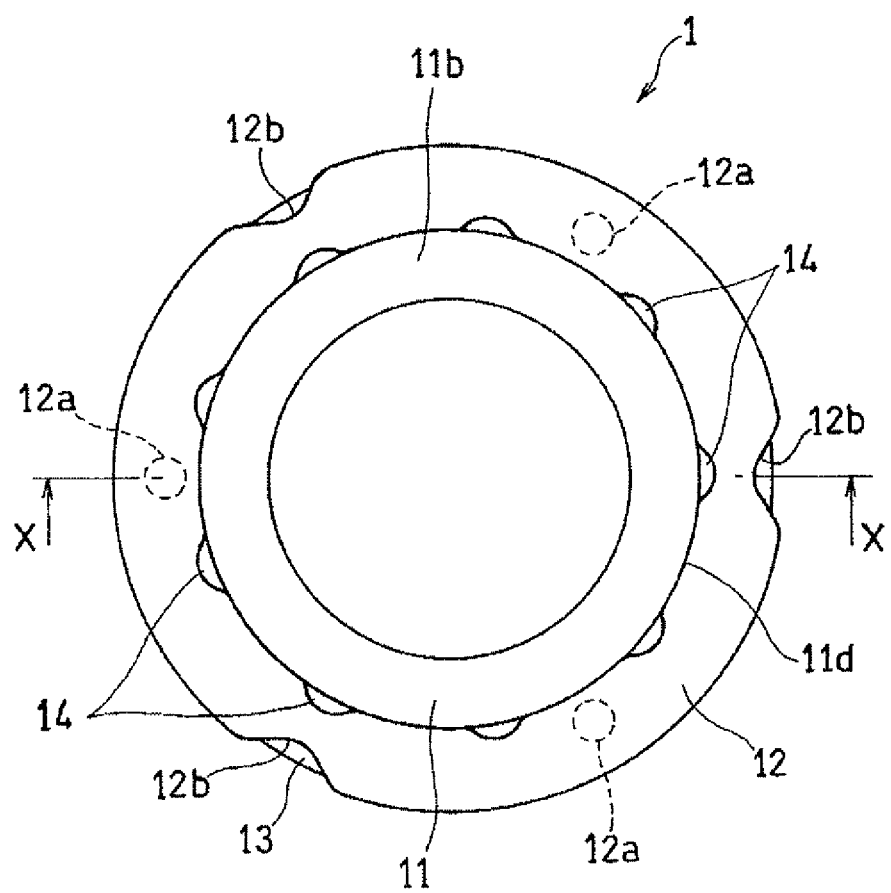
FIG. 1 is a plane view of one embodiment of the rubber gasket of the present invention.
Figure 2:
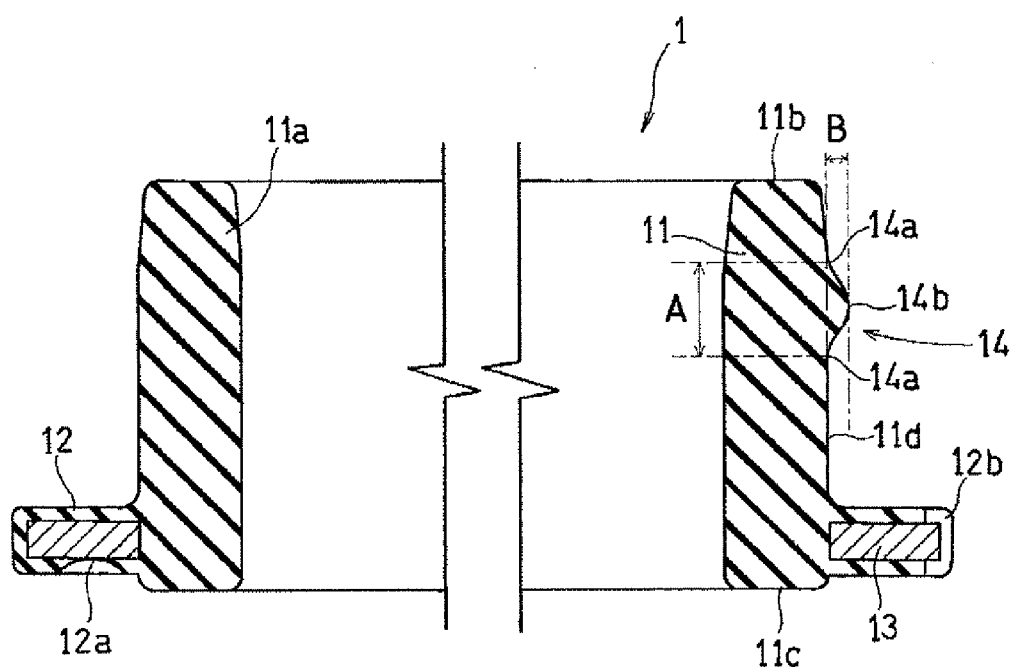
FIG. 2 is a partially broken enlarged sectional view in the direction of the arrows along the line X-X in FIG. 1
Figure 3:
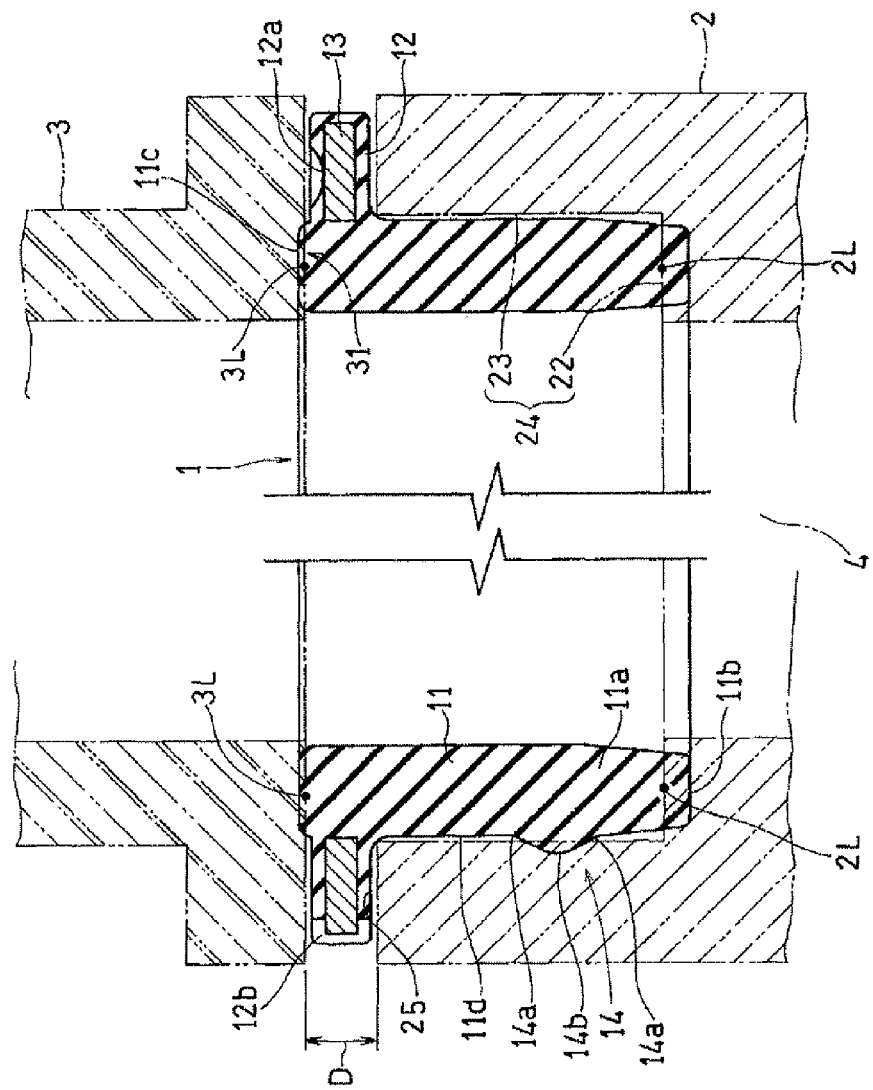
FIG. 3 is a conceptual partially broken enlarged view showing one example of the seal structure using the rubber gasket.

Embodiments of the present invention will be explained hereinafter referring to the drawings. FIG. 1 to FIG. 4 show the first embodiment of the rubber gasket of the present invention. A rubber gasket 1 in the figures is interposed between a cylinder head 2, one member and a cylinder head cover 3, the other member, which are objective members to be sealed and fastened to each other and a circular gasket used at an oil delivery section is exemplified as shown in FIG. 3. The cylinder head 2 is a cast product made of aluminum or the like and its upper end opening is formed with a step-shaped portion 24 of which inside is open by a step-floor portion 22 and an inner circumferential wall portion 23 being perpendicular to the step-floor portion 22, the step-floor portion 22 being constituted as an objective region to be sealed of the cylinder head 2. The cylinder head cover 3 is a molded body of synthetic resin, its lower end opening is formed like a flange, and a lower surface of the flange-shaped opening is formed as a flat-shaped portion 31 constituted as an objective region to be sealed. The flat-shaped portion 31 includes a virtual seal line portion 3L set for a design purpose along the entire circumferential direction. The step-floor portion 22 and the flat-shaped portion 31 of the cylinder head cover 3 are formed so as to have parallel relation with each other when the cylinder head 2 and the cylinder head cover 3 are fastened. The step-floor portion 22 includes a virtual seal line portion 2L set for a design purpose along the entire circumferential direction at a region corresponding to the seal line portion 3L.

The seal line portions refer to a central section of the objective region to be sealed of two objective members to be sealed and fastened to each other for a design purpose, so that the gasket has a corresponding seal line portion for a design purpose.

The rubber gasket 1 is an integrally molded body made of elastomer including a cylindrical body 11, a flange-shaped portion 12, and an annular core member 13, the flange-shaped portion 12 extending outward from an outer circumferential surface 11d of the cylindrical body 11 on one end portion 11c side in the axial direction along the entire circumference, and the annular core member 13 being embedded in the flange-shaped portion 12 along the entire circumference thereof. A cylindrical wall portion of the cylindrical body 11 is substantially in the shape of a vertically elongated rectangle in cross-section and an upper portion 11a is tapered so as to be slightly and gradually narrowed upward. The lower end surface 11c, one end portion in the axial direction and the upper end surface 11b, the other end portion in the axial direction, of the cylindrical body 11 are formed flat. In the embodiment shown in FIG. 1 to FIG. 4, an outward projecting portion 14 is intermittently formed on the outer circumferential surface 11d of the cylindrical body 11 along the circumferential direction. The projecting portion 14 has a foot portion 14a formed as a base portion of the expanding projecting portion 14 and a top portion 14b projecting outermost. Their shapes are not limited, but they are formed in such a manner that the distance (A) between the foot portions 14a, 14a becomes larger than projecting height (B) of the top portion 14b, namely A>B in the figures. The foot portion of the projecting portion 14 easily becomes a bucking point at the time of compression, so that the sectional shape of the projecting portion 14, sectional shape in the axial direction, seen from the arrow X-X in FIG. 1 is formed like a gentle chevron in such a manner that the projecting portion gradually expands from the foot portion 14a to the top portion 14b in order to reduce resistance when the projecting portion 14 is mounted on the step-shaped portion 24. Specifically, it is preferable that the relation of the distance (A) between the foot portions 14a, 14a and the projecting height (B) of the top portion 14b be A≥2×B, i.e. A is equal to or larger than 2 multiplies B, as shown in FIG. 2. The chevron shape of the projecting portion 14 is not formed so as to project like a convex curve from the foot portion 14a to the top portion 14b. However, the chevron shape of the projecting portion 14 is formed in such a manner that the foot portion 14a is formed like a gentle concave curve, for example, R4 to R7, and the chevron shape gradually expands from such a shaped foot portion 14a into the top portion 14b, for example, at an inclination angle of equal to or less than 45 degrees on the sectional view in the axial direction.

The core member 13 is only required to be a plate member having higher hardness than elastomer constituting the rubber gasket, for example, a metal plate, a synthetic resin plate or the like can be used.

Elastomer constituting the rubber gasket 1 includes rubber material such as ethylene-propylene rubber (EPDM), acrylonitrill butadiene rubber (NBR), styrene-butadiene rubber (SBR), acrylic rubber (ACM), hydrogenated acrylonitrill butadiene rubber (HNBR), silicone rubber (VMQ), fluorosilicone rubber (FVMQ), fluorine-containing rubber (FKM), butyl rubber, polyisobutylene rubber, or ethylene-propylene-diene copolymerized rubber (EPDM), or thermoplastic elastomer (olefinine series, polyester series, polyamide series, stylene series, or the like).

The rubber gasket 1 is, for example, molded by injecting the above-mentioned elastomer to upper and lower molds, not shown, having a desirably shaped cavity. When the above-mentioned rubber material is used as elastomer, unvulcanized rubber material as mentioned above is injected into the cavity of the upper and lower molds and is molded by vulcanization. A projection directly supporting the core member 13 and an inward projection directly abutting a circumferential edge portion of the core member 13 are provided in the cavity so as to provide the core member 13 at a predetermined position, and the unvulcanized rubber is injected with the core member 13 provided at a predetermined position in the cavity with the projections. The flange-shaped portion 12 of the rubber gasket 1 molded by vulcanization has a plurality of concave portions 12a, three in the figure, at equal intervals, per 120 degrees, on a rubber portion of the lower surface and a plurality of cutout portions 12b, three in the figure, exposing the core member 13 on a rubber portion of the circumferential edge portion at equal intervals, per 120 degrees. The cutout portion 12b is formed by the projection provided in each cavity of the upper and lower molds, the projection not only abutting the circumferential edge portion of the core member 13 but also holding a part of the core member 13 from the upper surface and the lower surface thereof, from above and below. When the core member 13 is thus held from above and below, the core member 13 can be appropriately positioned in the lateral direction and the vertical direction while the core member 13 is prevented from floating up by pressure of injecting unvulcanized rubber material.

It goes without saying that the rubber gasket 1 can be obtained by a well-known molding process other than injection molding.

Figure 5:
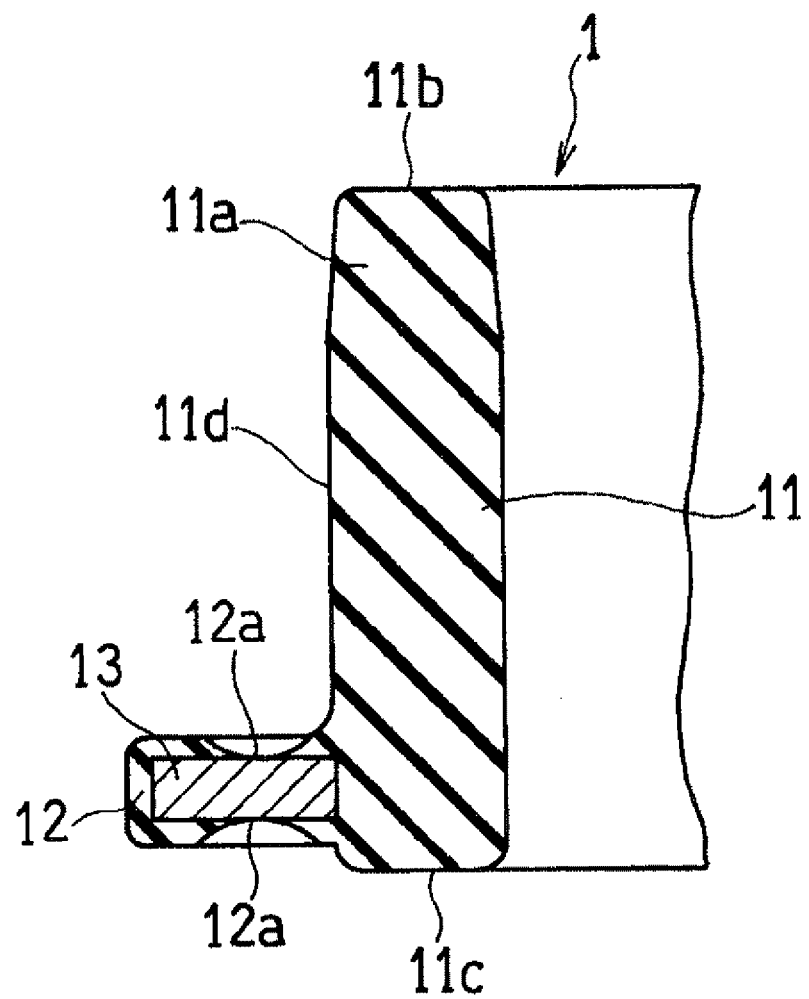
FIG. 5 is an enlarged sectional view of an essential part showing a modified example of the rubber gasket.
Figure 6:
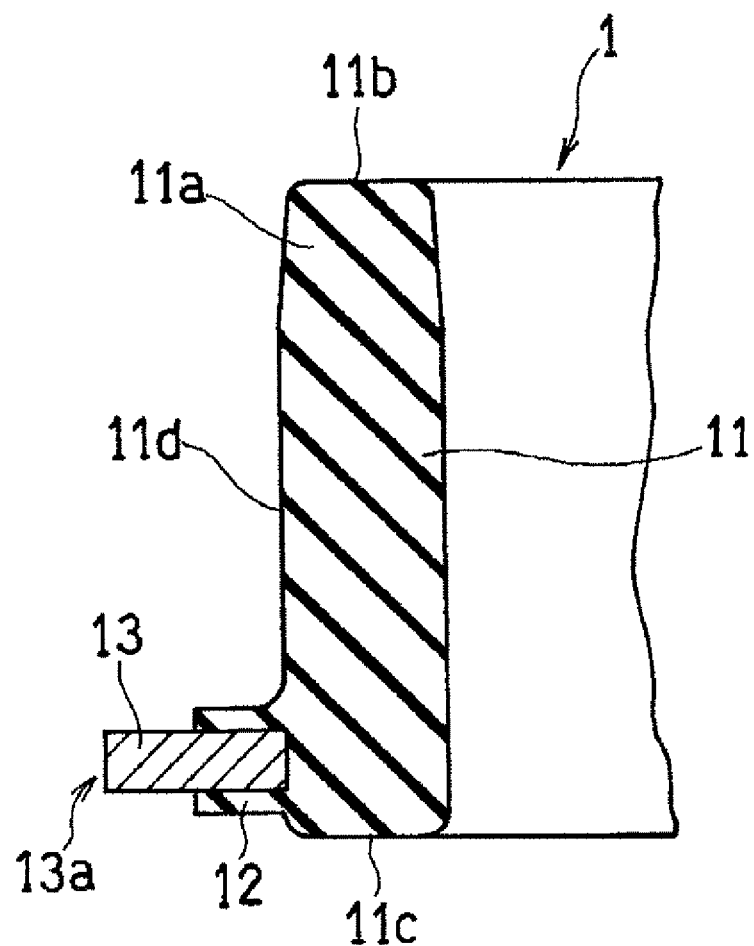
FIG. 6 is an enlarged sectional view of an essential part showing another modified example of the rubber gasket.

FIG. 5 and FIG. 6 show one example of the rubber gasket 1 molded with the upper and lower molds executed with another means for positioning the core member 13. In the example of FIG. 5, the concave portion 12a is also formed on the upper surface of the flange-shaped portion 12. The concave portions 12a on the upper and lower surfaces are formed by the projections provided for each cavity of the upper and lower molds so as to hold the core member 13 from above and below. The core member 13 is prevented from floating up by injection pressure when unvulcanized rubber is injected with the core member 13 held with the projections from above and below as mentioned above. In the example of FIG. 6, the circumferential edge portion on the outer circumferential side and the upper and lower surfaces of the core member 13 are exposed along the entire circumference. Each cavity of the upper and lower molds is shaped so as to directly grasp the exposing portion 13a of the core member 13, and then the exposing portion 13a is formed. As a result, the core member 13 is provided at a predetermined position without being displaced in the lateral direction or in the vertical direction and the above-mentioned vulcanization is executed.

Figure 4:
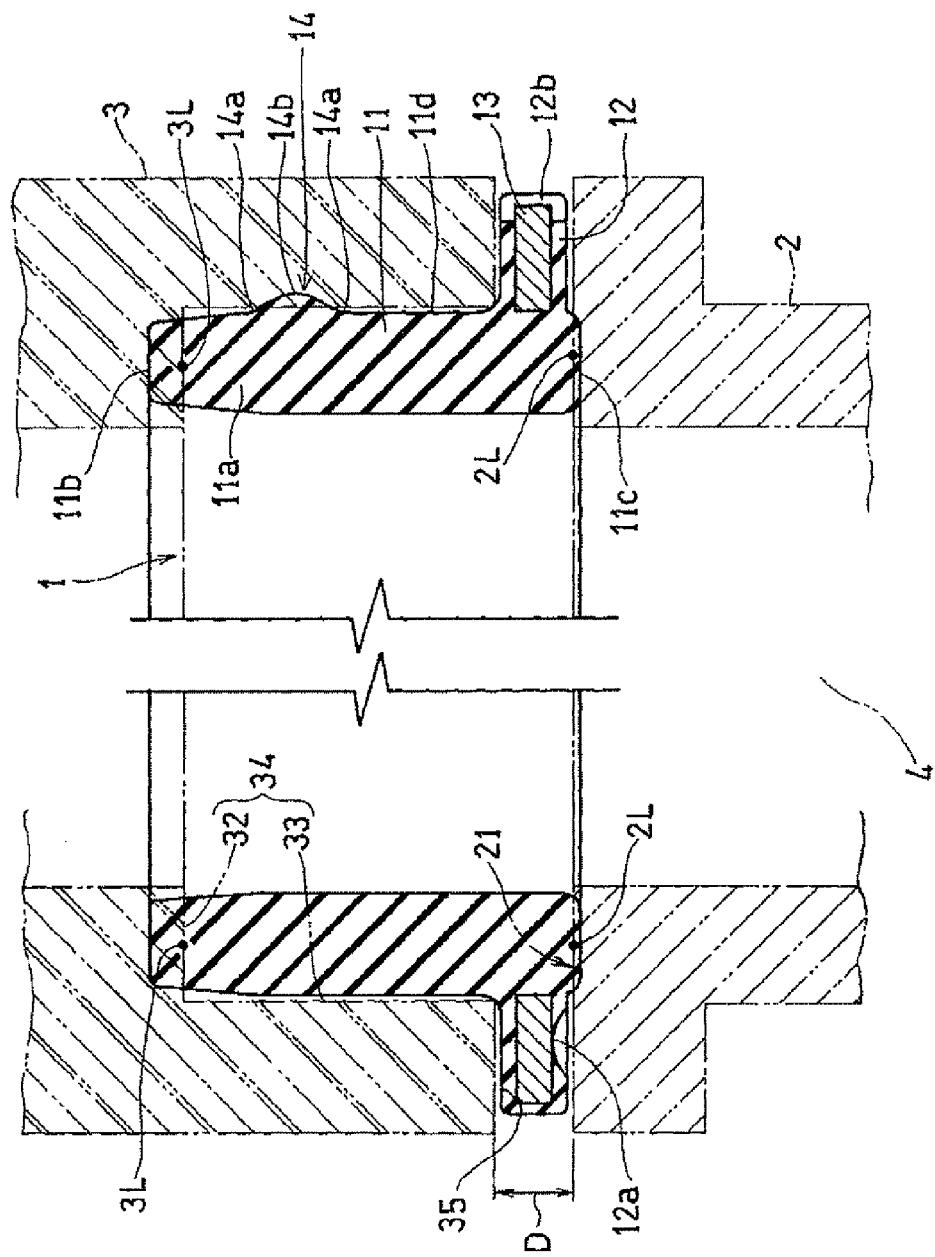
FIG. 4 is a view similar to FIG. 3 showing another example of the seal structure using the rubber gasket.

The rubber gasket 1 constructed as mentioned above is interposed between the cylinder head 2 and the cylinder head cover 3 to be fastened to each other as shown in FIG. 3 and FIG. 4, thereby constituting a seal structure between the cylinder head 2 and the cylinder head cover 3. How the gasket 1 is interposed will be briefly explained hereinafter. In the example in FIG. 3, one of the two objective members to be sealed and fastened to each other is the cylinder head 2 and the other member is the cylinder head cover 3. The rubber gasket 1 is turned upside-down from the position shown in FIG. 2 and the cylindrical body 11 is inserted into the step-shaped portion 24 from the upper portion 11a, downward in FIG. 3. The projecting portion 14 is provided on the outer circumferential surface 11d of the cylindrical body 11, so that the projecting portion 14 is made to contact under pressure the inner circumferential wall portion 23 of the step-shaped portion 24 and to be compressed in the inner diametrical direction of the cylindrical body 11, the height direction of the projecting portion 14, and then the cylindrical body 11 is inserted as mentioned above. Insertion resistance is added because of existence of the projecting portion 14. The cross-section of the projecting portion 14 is formed in the chevron shape gradually expanding from the foot portion 14a to the top portion 14b as mentioned above, so that the resistance is alleviated, the cylindrical body 11 does not lean when the gasket 1 is compressed thereafter, and insertion and attachment operations are facilitated.

Insertion operation is completed when the upper end surface 11b, downward in FIG. 3, of the cylindrical body 11 comes close to and faces the step-floor portion 22. Then, the cylinder head cover 3 is positioned in such a manner that the objective region to be sealed 31, a flat-shaped portion, is aligned to the objective region to be sealed 22, a step-floor portion, of the cylinder head 2. The lower end surface 11c, upward in FIG. 3, of the cylindrical body 11 is positioned so as to face the objective region to be sealed 31 of the cylinder head cover 3 including the seal line portion 3L. The cylinder head cover 3 is fastened to the cylinder head 2 with a fastening means such as bolts, not shown. The dotted lines in FIG. 3 show that the cylinder head 2 and the cylinder head cover 3 are fastened in a predetermined condition. The predetermined condition of fastening is a predetermined design conception in which the rubber gasket 1 secures surface pressure achieving enough seal function between two objective regions to be sealed by being compressed, and prevents excessive fastening pressure which causes damage of the cylinder head cover 3 and crack of the rubber gasket 1. In such a predetermined fastening condition, the cylindrical body 11 is compressed in the fastening direction, the cylindrical wall portion of the cylindrical body 11 expands in the thickness direction, and the outer circumferential surface 11d contacts under pressure the inner circumferential wall portion 23 of the step-shaped portion 24. The distance (gap) D between a region 25 outside the step-shaped portion 24 of the cylinder head 2 and a region outside the seal line portion 3L of the flat-shaped portion 31 of the cylinder head cover 3 is substantially equal to or a little larger than the thickness of the flange-shaped portion 13. Therefore, the flange-shaped portion 13 is kept from being applied with fastening pressure under such a predetermined fastening condition.

In fastening procedure, the step-floor portion 22 of the step-shaped portion 24 and the upper end surface 11b of the cylindrical body 11 contact under pressure each other in a surface contact condition, so that the upper portion 11a of the cylindrical body 11 does not lean inward because of contact resistance and regulation operation of the surface contact portion, although the cylinder head 2 does not have the above-mentioned inner wall. Fastening procedure is executed when the outer circumferential surface 11d of the cylindrical body 11 comes close to the inner circumferential wall portion 23 of the step-shaped portion 24, so that the outer circumferential surface 11d is regulated by contacting under pressure the inner circumferential wall portion 23 and does not lean outward. In case that the cross-section of the upper portion 11a is formed like a chevron, clearance with the inner circumferential wall portion 23 becomes large, so that the upper portion 11a easily leans inside or outside at the time of fastening and the compression condition is easily destroyed. In this embodiment, the cylindrical body 11 is compressed in the fastening direction at the time of the predetermined fastening condition, the upper end surface 11b and the lower end surface 11c elastically contact under pressure the step-floor portion 22 including the seal line portion 2L and the objective region to be sealed 31 including the seal line portion 3L, respectively. The cylindrical body 11 expands in the thickness direction and the outer circumferential surface 11d elastically contacts under pressure the inner circumferential wall portion 23. Therefore, the objective regions to be sealed of the cylinder head 2 and the cylinder head cover 3 are completely sealed and pressurized fluid circulating in an objective space to be sealed 4 is prevented from leaking outside.

Inner pressure is applied to the rubber gasket 1 when pressurized fluid communicates in the objective space to be sealed 4 as mentioned above. When inner pressure becomes as high as 0.6 MPa, ream function for the cylindrical body 11 increases. When the upper portion 11a of the cylindrical body 11 is formed in a chevron shape, because of the above-mentioned clearance, the upper portion 11a leans outward due to inner pressure and a compression condition by fastening is destroyed. As a result, a middle section of the cylindrical body 11 shows inward bucking because of fastening pressure, thereby deteriorating seal function. In this embodiment, the upper portion 11a is regulated with the inner circumferential wall portion 23 of the step-shaped portion 24, so that the upper portion 11a is prevented from leaning and deforming; in addition, self-seal function works by inner pressure, thereby further enhancing seal function as a gasket. The core member 13 is provided in a section corresponding to the gap D, so that outward flow deformation of rubber is prevented in the corresponding section, thereby keeping seal function including self-seal function without being deteriorated. Fastening pressure does not work where the core member 13 is provided, so that no crack is caused on the boundary surface of the core member 13 and rubber.

In the above-mentioned assembly procedure of the cylinder head cover 3 to the cylinder head 2, the cylinder head cover 3 is sometimes removed for adjustment after assembly. In such a case, the rubber gasket 1 is apt to go upward together with the cylinder head cover 3 because of adherence property inherent to rubber. However, the projecting portion 14 is compressed by the inner circumferential wall portion 23, so that the above-mentioned go-upward movement is blocked because of fastening force relative to the inner circumferential wall portion 23 by such compression, and the rubber gasket 1 is kept being held with the step-shaped portion 24. In case that the cylinder head 2 is required to be laid horizontally or to be another configuration during the assembly procedure, the rubber gasket 1 is not removed by the fastening force. Smoothness of the above-mentioned assembly operation is not damaged because of removal prevention function of the rubber gasket 1 by the projecting portion 14. In addition, the projecting portion 14 has centering function in the groove, the step-shaped portion 24, of the rubber gasket 1, so that both seal line portions of the cylinder head 2 and the rubber gasket 1 are appropriately arranged.

The projecting portion 14 has removal prevention function of the rubber gasket 1. In case that volume, namely sectional area, of the projecting portion 14 increases or is formed so as to rapidly expand from the outer circumferential surface of the cylindrical body 11 for taking priority of the removal prevention function, compression reaction force of the projecting portion 14 becomes large at the time of the insertion process and the middle section of the cylindrical body 11 overhangs inward. Such overhang becomes a start point of bucking of the cylindrical body 11 by fastening pressure, so that in the present embodiment the projecting portion 14 is designed in such a manner that the distance (A) between the foot portions 14a, 14a becomes larger than the projection height (B) of the top portion 14b and the sectional shape of the projecting portion 14 in the axial direction is formed like a gentle chevron gradually expanding from the foot portion 14a to the top portion 14b. As a result, the projecting portion 14 is easily crushed by pressure at the insertion operation and does not become a start point of bucking. The projecting portion 14 is intermittently formed along the outer circumferential surface 11d of the cylindrical body 11 along the circumferential direction, so that resistance at the time of the insertion process is alleviated; in addition, air is not trapped in a corner portion of the inner circumferential wall portion 23 and the step-floor portion 22 when the cylinder head 2 and the cylinder head cover 3 are fastened to each other and the cylindrical body 11 is compressed in the fastening direction, thereby self-seal ability is not damaged.

The example in FIG. 4 shows that one of the two objective members to be sealed and fastened to each other is the cylinder head cover 3 and the other is the cylinder head 2. In this example, the cylinder head 2 is a cast product made of aluminum as mentioned above, the opening at the upper end is formed like a flange, and the upper surface of the flange-shaped portion is formed as the flat-shaped portion 21 constituted as the objective region to be sealed. The flat-shaped portion 21 includes the virtual seal line portion 2L set for a design purpose along the entire circumferential direction. The cylinder head cover 3 is a molded body of synthetic resin as mentioned above, its lower end opening is formed so as to have a step-shaped portion 34 of which inside is open by a step-floor portion 32 constituted as the objective member to be sealed and an inner circumferential wall portion 33 being perpendicular to the step-floor portion 32. The step-floor portion 32 and the flat-shaped portion 21 of the cylinder head 2 are formed in parallel relation when the cylinder head 2 and the cylinder head cover 3 are fastened. The floor-step portion 32 includes the virtual seal line portion 3L set for a design purpose along the entire circumference at a region corresponding to the seal line portion 2L.

The cylinder head cover 3 is turned upside-down to make the step-shaped portion 34 upward. The rubber gasket 1 is also turned upside-down from the position shown in FIG. 2 and the cylindrical body 11 is inserted into the step-shaped portion 34 from the upper portion 11a. The projecting portion 14 is provided on the outer circumferential surface 11d of the cylindrical body 11, so that the projecting portion 14 is made to contact under pressure the inner circumferential wall portion 33 of the step-shaped portion 34 and to be compressed in the inner diametrical direction of the cylindrical body 11, the height direction of the projecting portion 14, and then the cylindrical body 11 is inserted as mentioned above. The projecting portion 14 has the above-mentioned cross-section, so that resistance is alleviated as mentioned above, the cylindrical body 11 does not lean when the gasket 1 is compressed thereafter, and insertion and attachment operations are facilitated.

Insertion operation is completed when the upper end surface 11b of the cylindrical body 11 comes close to and faces the step-floor portion 32. Then, the cylinder head cover 3 is turned upside-down in such a manner that the step-shaped portion 34 comes downward. The projecting portion 14 is kept being compressed, and the rubber gasket 1 is held under a fastened condition into the step-shaped portion 34 by compression reaction force, so that the rubber gasket 1 does not remove at the time of reverse rotation. Therefore, a series of assembly operations from attachment of the rubber gasket 1 to fastening of the cylinder head cover 3 and the cylinder head 2 as mentioned later is executed smoothly. The cylinder head cover 3 is positioned in such a manner that the objective region to be sealed 32, the step-floor portion, is aligned to the objective region to be sealed 21, the flat-shaped portion, of the cylinder head 2 while the rubber gasket 1 is held with the step-shaped portion 34. In such a case, the lower end surface 11c of the cylindrical body 11 is positioned so as to face the flat-shaped portion 21 including the seal line portion 2L.

The cylinder head cover 3 is fastened to the cylinder head 2 with a fastening means such as bolts, not shown, as mentioned above. The two dotted lines in FIG. 4 show that the cylinder head cover 3 and the cylinder head 2 are fastened in a predetermined condition like FIG. 3. The rubber gasket 1 is interposed between the cylinder head cover 3 and the cylinder head 2 in the predetermined condition as mentioned above. The cylindrical body 11 is compressed in the fastening direction, the cylindrical wall portion of the cylindrical body 11 expands in the thickness direction, and the outer circumferential surface 11d comes into contact under pressure the inner circumferential wall portion 33 of the step-shaped portion 34. The distance (gap) D between a region 35 outside the step-shaped portion 34 of the cylinder head cover 3 and a region outside the seal line portion 2L of the flat-shaped portion 21 of the cylinder head 2 is substantially equal to or a little larger than thickness of the flange-shaped portion 13. Therefore, the flange-shaped portion 13 is not applied with fastening pressure under the predetermined fastening condition as mentioned above.

In the fastening procedure, the step-floor portion 32 of the step-shaped portion 34 and the upper end surface 11b of the cylindrical body 11 contact under pressure each other in a surface contact condition, so that the upper portion 11a of the cylindrical body 11 does not lean inward because of contact resistance and regulation operation of a surface contact section, even though the cylinder head cover 3 does not have the above-mentioned inner wall. Fastening is executed when the outer circumferential surface 11d of the cylindrical body 11 comes close to the inner circumferential wall portion 33 of the step-shaped portion 34, so that the outer circumferential surface 11d is regulated by contacting under pressure the inner circumferential wall portion 33 and the outer circumferential surface 11d does not lean outward. In such a fastening condition of the cylinder head cover 3 and the cylinder head 2, the objective regions to be sealed thereof are completely sealed as mentioned above and pressurized fluid circulating in the objective space to be sealed 4 is prevented from leaking outside. Self-seal function by inner pressure caused by regulating the cylindrical portion 11 with the inner circumferential wall portion 33 of the step-shaped portion 34 and function of the core member 13 of the flange-shaped portion 12 can be achieved as mentioned above.

Figure 7:
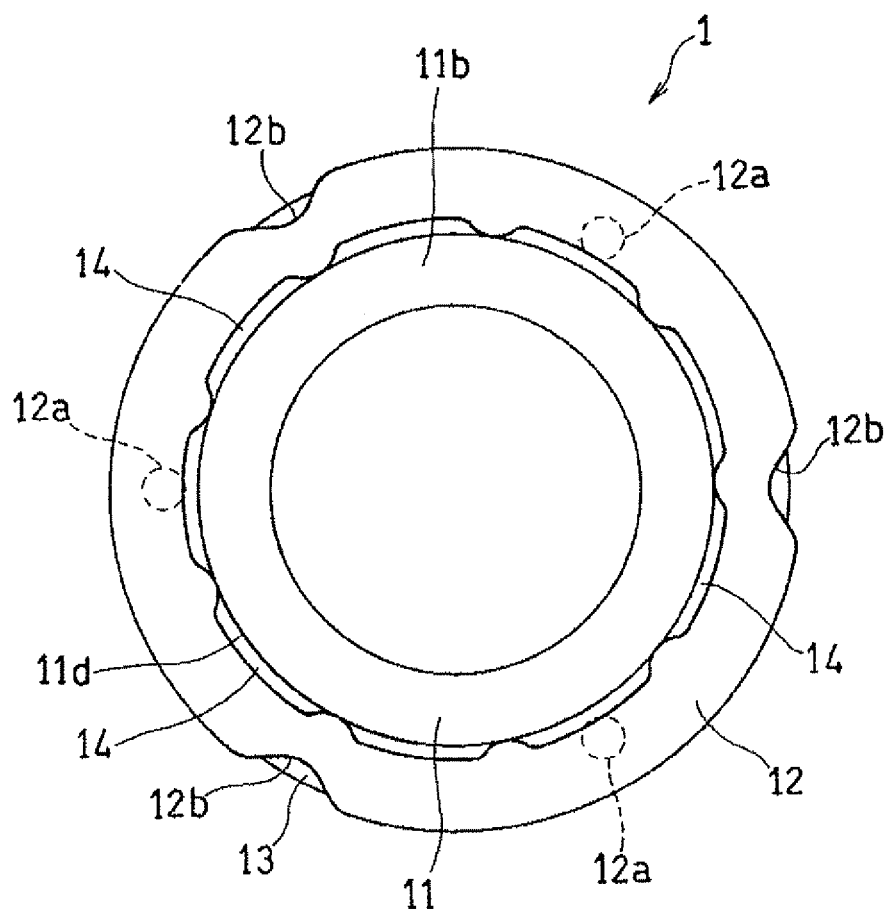
FIG. 7 is a plane view of another embodiment of the rubber gasket of the present invention.
Figure 8:
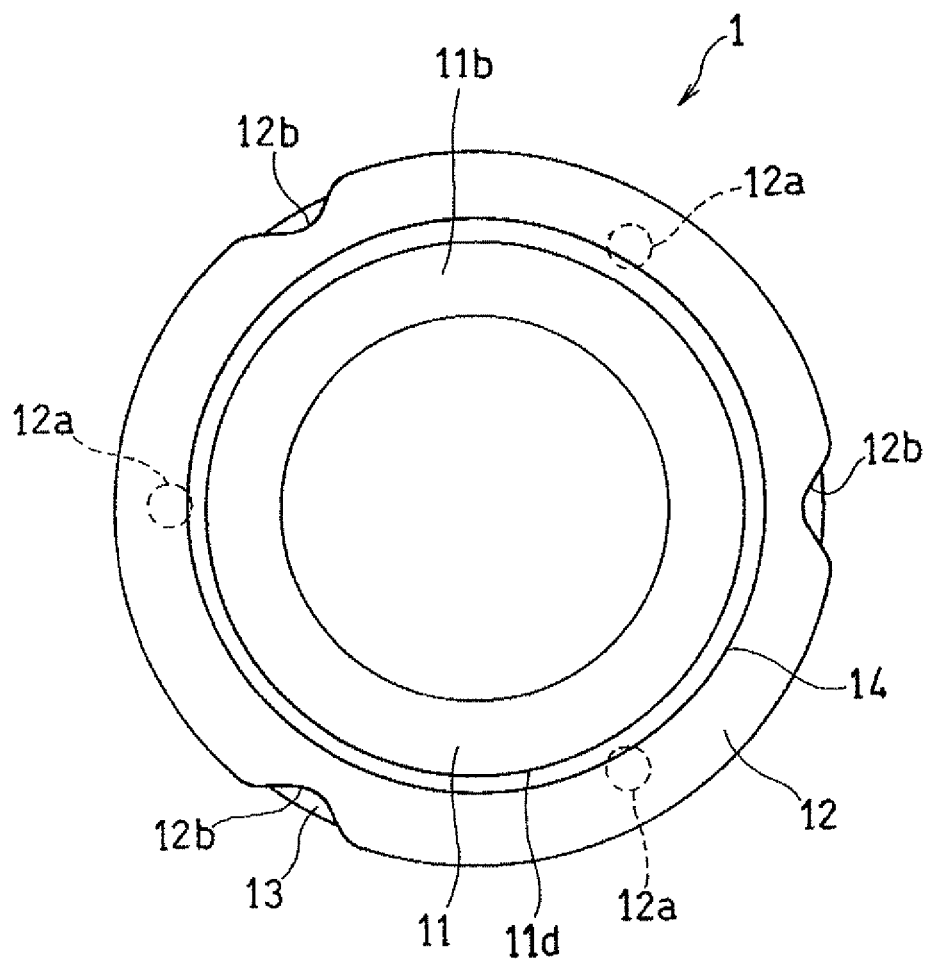
FIG. 8 is a plane view of another embodiment of the rubber gasket of the present invention.

The shape of the projecting portion 14 is determined depending on design in view of removal or drop-out prevention function and generation of a bucking point. FIG. 7 and FIG. 8 show another example of configuration of the projecting portion 14. The example in FIG. 7 is common to the above-mentioned example in that the projecting portion 14 is intermittently formed along the circumferential direction of the outer circumferential surface lid of the cylindrical body 11; however, it is different from the above-mentioned example in that length of the projecting portion 14 along the circumferential direction is increased in order to strengthen removal or drop-out prevention function. In this example, occupancy of the projecting portion 14 along the circumferential direction of the outer circumferential surface 11d is increased more than the example shown in FIG. 1 in order to further strengthen removal or drop-out prevention function. In the example in FIG. 8, the projecting portion 14 is formed continuously along the entire circumference of the outer circumferential surface 11d of the cylindrical body 11 in order to further strengthen removal or drop-out prevention function. The shape of the projecting portion 14 is determined depending on design in view of removal or drop-out prevention function and generation of a bucking point as mentioned above. In case of the example in FIG. 8 it is preferable that a plurality of slits, which are enough not to reduce self-seal ability, be provided for the inner circumferential wall portion 23 (33) in the longitudinal direction, fastening direction, in order to prevent trapping of air as mentioned above.

Other structures are the same as those in the above-mentioned example, the same reference numbers are allotted to the common members and their explanation is omitted here. The modified example in FIG. 5 or FIG. 6 can be of course applied to the example in FIG. 7 or FIG. 8.

In the above-mentioned embodiments, the rubber gasket 1 of the present invention is interposed between the cylinder head 2 and the cylinder head cover 3 of internal combustion engines; however, the present invention is not limited to such embodiments. The rubber gasket 1 can be interposed between two objective members to be sealed of components of internal combustion engines or other industrial machines. The shape of the rubber gasket 1 is not limited to be circular as shown in the figures and can be an annular shape depending on the object to be applied. It is highly useful that the present invention is applied to such an example in which one of the two objective members to be sealed is a molded body made of synthetic resin, the other is made of metal, including a cast product, and highly pressurized fluid circulates in the objective space to be sealed; however, the present invention can be of course applied to an example in which two objective members are made of the same material. Elastomer constituting the rubber gasket is rubber in the above-mentioned embodiment; however, the rubber gasket of the present invention can be of course constituted with other kinds of elastomer mentioned above.

1 rubber gasket
11 cylindrical body
11b upper end surface (other end surface)
11c lower end surface (one end surface)
11d outer circumferential surface
12 flange-shaped portion
13 core member
14 projecting portion
14a foot portion
2 cylinder head (one member or the other member of two objective members to be sealed)
3 cylinder head cover (the other member or one member of two objective members to be sealed)
21, 31 flat-shaped portion
2L, 3L seal line portion
22, 32 step-floor portion
23, 33 inner circumferential wall portion
24, 34 step-shaped portion
D distance (gap)

The invention claimed is:

1. A rubber gasket of annular shape adapted to be interposed between two objective members to be sealed and fastened to each other, wherein:
one of said two objective members to be sealed has a step-shaped portion of which inside is opened by a step-floor portion and an inner circumferential wall portion perpendicular to said step-floor portion, whereas the other member of said two objective members has a flat-shaped portion parallel to said step-floor portion;
said rubber gasket comprises an integrally molded body made of elastomer having a cylindrical body, a flange-shaped portion, and an annular core member, said cylindrical body having no said annular core member therein and being interposed in said step-shaped portion and being made solely of elastomer, said flange-shaped portion extending outward from one end of said cylindrical body in axial direction along an entire outer circumferential surface, said annular core member being embedded in said flange-shaped portion along an entire circumference; and
said rubber gasket is constructed such that when said two objective members to be sealed are fastened with said rubber gasket interposed therebetween, both ends of said cylindrical body in axial direction thereof are positioned respectively at seal line portions of said two objective members to be sealed, said cylindrical body is compressed by fastening force along fastening direction, and said flange-shaped portion is positioned outside said seal line portion in diametrical direction and is interposed in a gap formed between said two objective members to be sealed.

2. The rubber gasket as set forth in claim 1, wherein:
an outward projecting portion is provided on the outer circumferential surface of said cylindrical body.

3. The rubber gasket as set forth in claim 2, wherein:
said projecting portion has foot portions constituted as a base portion from which said projecting portion expands outward and a top portion projecting outermost; and
said projecting portion is constructed such that distance between said foot portions is larger than projecting height of said top portion, and a cross-section of said projecting portion is formed in the shape of a gentle chevron in such a manner that said foot portions gradually expand toward said top portion.

4. The rubber gasket as set forth in claim 3, wherein:
said projecting portion is intermittently provided along circumferential direction of said cylindrical body.

5. The rubber gasket as set forth in claim 2, wherein:
said projecting portion is intermittently provided along circumferential direction of said cylindrical body.

6. A seal structure for sealing between two objective members to be sealed and fastened to each other using the rubber gasket as set forth in claim 1, wherein:
said rubber gasket is constructed such that when said two objective members to be sealed are fastened with said rubber gasket interposed therebetween, said one end of said cylindrical body in axial direction faces said flat-shaped portion of said other member and said other end of said cylindrical body in axial direction faces said step-floor portion of said one member, and said outer circumferential surface of said cylindrical body faces said inner circumferential wall portion; and
when said two objective members to be sealed are fastened under a predetermined fastening condition, with said cylindrical body being compressed by fastening force along fastening direction, and with said flange-shaped portion positioned outside said seal line portion in diametrical direction, a gap is formed between said two objective members to be sealed where said flange-shaped portion is interposed, thereby said fastening force does not act on said flange-shaped portion.

7. A seal structure for sealing between two objective members to be sealed and fastened to each other using the rubber gasket as set forth in claim 2, wherein:
said rubber gasket is constructed such that when said two objective members to be sealed are fastened with said rubber gasket interposed therebetween, said one end of said cylindrical body in axial direction faces said flat-shaped portion of said other member and said other end of said cylindrical body in axial direction faces said step-floor portion of said one member, and said outer circumferential surface of said cylindrical body faces said inner circumferential wall portion; and
when said two objective members to be sealed are fastened under a predetermined fastening condition, with said cylindrical body being compressed by fastening force along fastening direction, and with said flange-shaped portion positioned outside said seal line portion in diametrical direction, a gap is formed between said two objective members to be sealed where said flange-shaped portion is interposed, thereby said fastening force does not act on said flange-shaped portion.

8. A seal structure for sealing between two objective members to be sealed and fastened to each other using the rubber gasket as set forth in claim 3, wherein:
said rubber gasket is constructed such that when said two objective members to be sealed are fastened with said rubber gasket interposed therebetween, said one end of said cylindrical body in axial direction faces said flat-shaped portion of said other member and said other end of said cylindrical body in axial direction faces said step-floor portion of said one member, and said outer circumferential surface of said cylindrical body faces said inner circumferential wall portion; and
when said two objective members to be sealed are fastened under a predetermined fastening condition, with said cylindrical body being compressed by fastening force along fastening direction, and with said flange-shaped portion positioned outside said seal line portion in diametrical direction, a gap is formed between said two objective members to be sealed where said flange-shaped portion is interposed, thereby said fastening force does not act on said flange-shaped portion.

9. A seal structure for sealing between two objective members to be sealed and fastened to each other using the rubber gasket as set forth in claim 5, wherein:
said rubber gasket is constructed such that when said two objective members to be sealed are fastened with said rubber gasket interposed therebetween, said one end of said cylindrical body in axial direction faces said flat-shaped portion of said other member and said other end of said cylindrical body in axial direction faces said step-floor portion of said one member, and said outer circumferential surface of said cylindrical body faces said inner circumferential wall portion; and
when said two objective members to be sealed are fastened under a predetermined fastening condition, with said cylindrical body being compressed by fastening force along fastening direction, and with said flange-shaped portion positioned outside said seal line portion in diametrical direction, a gap is formed between said two objective members to be sealed where said flange-shaped portion is interposed, thereby said fastening force does not act on said flange-shaped portion.

* * * * *